United States Patent [19]

Murakami et al.

[11] 4,236,732

[45] Dec. 2, 1980

[54] HEAT-SENSITIVE RECORD MATERIAL

[75] Inventors: Takeshi Murakami, Osaka; Yoshitaka Oeda, Nara; Hiroo Hayashi, Kyoto; Teruo Nakamura, Mabikino, all of Japan

[73] Assignee: Kanzaki Paper Manufacturing Co., Ltd., Japan

[21] Appl. No.: 841,396

[22] Filed: Oct. 12, 1977

[30] Foreign Application Priority Data

Oct. 16, 1976 [JP] Japan .............................. 51-123980

[51] Int. Cl.[3] ............................ B41L 1/20; B32B 5/16

[52] U.S. Cl. .................................. 282/27.5; 428/207; 428/211; 428/325; 428/913

[58] Field of Search ............... 282/27.5; 428/207, 211, 428/913, 325

[56] References Cited

U.S. PATENT DOCUMENTS

| | | | |
|---|---|---|---|
| 3,859,111 | 1/1975 | Takanishi et al. | 428/913 |
| 4,007,310 | 2/1977 | Miyamoto et al. | 282/27.5 X |
| 4,020,261 | 4/1977 | Odau et al. | 428/325 |
| 4,025,090 | 5/1977 | Petitpierre | 282/27.5 |
| 4,032,690 | 6/1977 | Kohmura et al. | 428/913 X |
| 4,047,738 | 9/1977 | Isaac et al. | 282/27.5 |

FOREIGN PATENT DOCUMENTS

| | | |
|---|---|---|
| 43-4160 | 2/1968 | Japan . |
| 48-19231 | 3/1973 | Japan . |
| 53-14531 | 5/1978 | Japan . |

*Primary Examiner*—Thomas J. Herbert, Jr.
*Attorney, Agent, or Firm*—Morgan, Finnegan, Pine, Foley & Lee

[57] ABSTRACT

In a heat-sensitive record material comprising a base sheet having a color developing layer which includes finely divided particles of chromogenic material and finely divided particles of acceptor, a heat fusible material having a relatively low melting point is included in said finely divided particles of chromogenic material and/or said finely divided particles of acceptor.

9 Claims, No Drawings

HEAT-SENSITIVE RECORD MATERIAL

BACKGROUND OF THE INVENTION

This invention relates to a heat-sensitive record material and particularly to a heat-sensitive record material which has an improved heat-sensitivity and is adapted for a high speed recording so that it may find its usefulness as a recording medium for information machines and instruments such as facsimiles, electronic computers and telex machines.

There is known a heat-sensitive record material comprising a base sheet having a color developing layer which includes finely divided particles of one of colorless chromogenic materials such as triphenylmethane compounds, fluoran compounds auramine compounds and spiropyran compounds and finely divided particles of one of organic acceptors such as phenolic compounds, aromatic carboxylic acids and their polyvalent metal salt and/or one of inorganic acceptors such as activated clay, acid clay, attapulgite, aluminum silicate and talc. In such the heat sensitive record material like this the above mentioned two kinds of particles are, when at least one of them is melted or sublimated at an elevated temperature, brought into intimate contact with each other to develop a color. Accordingly, a relatively high temperature is required for obtaining clear and distinct color images. This is apparently disadvantageous since clear and distinct color images can never be expected at a high speed recording.

With an attempt to avoid the above mentioned disadvantages it has been proposed to disperse in the color developing layer a heat fusible material which can when melted, dissolve at least one of the colorless chromogenic material and the acceptor therein, e.g., as disclosed Japanese Patent Publication No. 4160 of 1968 and Japanese Kokai (Laid-Open) Patent Publication No. 19,231 of 1973. In this manner the heat sensitivity at low temperatures is improved. This improved system is useful for obtaining clear and distinct images if time for heating is relatively long as in case of the infrared copying. This system is not however utilizable for a high speed recording with such an extremely short heating time as 1 to 4 milliseconds which are required in high speed facsimiles since color can never be developed enough.

The primary object of the invention is to provide an improved heat-sensitive record material which can avoid the above mentioned disadvantages inherent with the conventional systems and can satisfactorily meet the requirements of recording machines and implements in which recording is carried out at a high speed and with a high image density.

Another object of the invention is to provide an improved heat-sensitive record materal which is immediately heat responsive and a good heat-sensitivity at low temperatures.

Other objects and advantages of the invention will be apparent from the following detailed description.

SUMMARY OF THE INVENTION

The heat-sensitive record material according to the invention comprises a base sheet having a color developing layer which includes finely divided particles comprising colorless chromogenic material and finely divided particles comprising acceptor which is reactive with the colorless chromogenic material to develop a color. At least one of those two kinds of finely divided particles further include a heat fusible material having a melting point within the range of 60° C. to 200° C., preferably 65° C. to 120° C. The heat fusible material is capable of dissolving at least one of colorless chromogenic material and acceptor therein when melted.

In case where the heat fusible material is incorporated to the colorless chromogenic material as one aspect of the invention, the heat fusible material should not be substantially reactive on the colorless chromogenic material.

The heat fusible material may also be incorporated to the acceptor which may be an organic acceptor or a mixture of an organic acceptor and an inorganic acceptor.

The finely divided particles of colorless chromogenic material or acceptor may further include at least one inorganic metal compound or inorganic pigment.

The amount of the heat fusible material may preferably be within the range of 0.2 to 30 parts by weight per one part by weight of the colorless chromogenic material or acceptor.

DETAILED DESCRIPTION OF THE INVENTION

Any of various known colorless chromogenic materials may be used for the present invention. Among them there are included, by way of examples, 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis-(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide, 4,4′-bis-dimethylaminobenzhydrine benzylether, N-halophenyl-leucoauramine, N-2,4,5-trichlorophenyl-leucoauramine, rhodamine-B-anilinolactam, rhodamine-(p-nitroanilino)lactam, rhodamine-(p-chloroanilino)lactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,3-dimethylfluoran, 7-diethylamino-(3-acetylmethylamino)fluoran 7-diethylamino-(3-methylamino) fluoran, 3,7-diethylaminofluoran, 7-diethylamino-3-(dibenzylamino)fluoran, 7-diethylamino-3-(methylbenzylamino) fluoran, 7-diethylamino-3-(chloroethylmethylamino)fluoran, 7-diethylamino-3-(diethylamino)fluoran, 2-phenylamino-3-methyl-6-(N-ethyl-N-p-toluyl)amino-fluoran, benzoylleucomethyleneblue, p-nitrobenzyl-leucomethylene blue, 3-methyl-spirodinaphtopyrane, 3-ethyl-spirodinaphthopyrane, 3,3′-dichloro-spirodinaphthopyrane, 3-benzylspiro-dinaphthopyrane, 3-methyl-naphtho-(3-methoxy-benzo)-spiropyrane and 3-propyl-spiro-dibenzopyrane. The above colorless chromogenic materials may be used either solely or in combination.

The acceptor as the other reactant of the heat-sensitive record material according to the invention may be either organic or inorganic.

Among organic acceptors there are included phenolic compounds, aromatic carboxylic acids and their polyvalent metal salt.

Typical phenolic compounds which can be used as acceptor are:

4-tert-butylphenol, 4-hydroxydiphenoxide, α-naphthol, β-naphthol, 4-hydroxyacetophenol 4-tert-octylcatechol, 2,2'-dihydroxydiphenol, 2,2'-methylene-bis(4-methyl-6-tert-isobutylphenol), 4,4'-isopropylidene-bis-(2-tert-butylphenol), 4,4'-sec-butylidenediphenol, 4-phenylphenol, 4,4'-isopropylidenediphenol(bisphenol A), 2,2-methylene-bis(4-chlorophenol), hydroquinone, 4,4'-cyclohexylidenediphenol, novolak phenol resin and other phenol polymers.

Typical aromatic carboxylic acids which can be used as acceptor are:

aromatic carboxylic acids, for example, benzoic acid, o-toluylic acid, m-toluylic acid, p-toluylic acid, p-tert-butylbenzoic acid, o-chlorobenzoic acid, p-chlorobenzoic acid, dichlorobenzoic acid, trichlorobenzoic acid, phthalic acid, isophthalic acid, terephthalic acid, 2-carboxybiphenyl, 3-carboxybiphenyl, m-hydroxybenzoic acid, p-hydroxybenzoic acid, anisic acid, p-ethoxybenzoic acid, p-propoxybenzoic acid, p-benzyloxybenzoic acid, p-phenoxybenzoic acid, gallic acid, anthranilic acid, m-aminobenzoic acid, p-aminobenzoic acid, phthalic acid monoamide, phthalic acid monoanilide, 3-isopropyl-4-hydroxybenzoic acid, 3-sec-butyl-4-hydroxybenzoic acid, 3-cyclohexyl-4-hydroxybenzoic acid, 3-phenyl-4-hydroxybenzoic acid, 3-benzyl-4-hydroxybenzoic acid, 3,5-dimethyl-4-hydroxybenzoic acid, 3,5-dichloro-4-hydroxybenzoic acid, trimellitic acid, pyromellitic acid, α-naphthoic acid, β-naphthoic acid, tetrachlorophthalic acid, 2,2'-dicarboxydiphenyl, salicylic acid, o-cresotinic acid, m-cresotinic acid, p-cresotinic acid, 3-ethylsalicylic acid, 4-ethylsalicylic acid, 3-isopropyl-salicylic acid, 3-sec-butylsalicylic acid, 5-sec-butyl-salicylic acid, 3-tert-butylsalicylic acid, 3-cyclohexyl-salicylic acid, 5-cyclohexylsalicylic acid, 3-phenyl-salicylic acid, 5-phenylsalicylic acid, 3-benzylsalicylic acid, 5-benzylsalicylic acid, 5-tert-octylsalicylic acid, 3-(α-methylbenzyl)salicylic acid, 5-(α-methylbenzyl)-salicylic acid, 3-nonylsalicylic acid, 5-nonylsalicylic acid, 5-(α,α-dimethylbenzyl)salicylic acid, 3-chlorosalicylic acid, 5-chlorosalicylic acid, 3-hydroxy-salicylic acid, 4-hydroxysalicylic acid, 5-hydroxy-salicylic acid, 6-hydroxy salicylic acid, 3-methoxysalicylic acid, 3-ethoxysalicylic acid, 4-methoxysalicylic acid, 5-methoxysalicylic acid, 5-benzyloxysalicylic acid, 5-octoxysalicylic acid, 3,5-dichlorosalicylic acid, 3-chloro-5-methylsalicylic acid, 3-chloro-5-ethylsalicylic acid, 3-chloro-5-isopropylsalicylic acid 3-chloro-5-tert-butylsalicylic acid, 3-chloro-5-cyclohexylsalicylic acid, 3-chloro-5-phenylsalicylic acid, 3-chloro-5-(α-methyl-benzyl)salicylic acid, 3-chloro-5-(α,α-dimethylbenzyl)-salicylic acid, 3-chloro-5-chlorosalicylic acid, 3,5-dimethylsalicylic acid, 3-methyl-5-tert-butylsalicylic acid, 3-isopropyl-5-tert-butylsalicylic acid, 3-isopropyl-5-cyclohexylsalicylic acid, 3-isopropyl-5-(α-methylbenzyl)-salicylic acid, 3-isopropyl-5-(α,α-dimethylbenzyl)-salicylic acid, 3-sec-butyl-5-tert-butylsalicylic acid, 3-tert-butyl-5-cyclohexylsalicylic acid, 3-tert-butyl-5-(4-tert-butylphenyl)salicylic acid, 3-(4'-tert-octyl-phenyl)-5-tert-octylsalicylic acid, 3-{4'-(α,α-dimethyl-benzyl)phenyl}-5-(α,α-dimethylbenzyl)-salicylic acid, 3,5-di-α-methylbenzylsalicylic acid, 3,5-di-α, α-dimethylbenzylsalicylic acid, 3-phenyl-5-α, α-dimethylbenzylsalicylic acid, 3-hydroxysalicylic acid, 1-hydroxy-2-carboxynaphthalene, 1-hydroxy-2-carboxy-4-isopropylnaphthalene, 1-hydroxy-2-carboxyl-7-cyclohexylnaphthalene, 5-(4'-hydroxybenzyl)salicylic acid, 5-(3'-carboxyl-4'-hydroxybenzyl)salicylic acid and 3-(α,α-dimethylbenzyl)-5-{3'-carboxyl-4'-hydroxy-5-(α,α-dimethylbenzyl)benzyl}salicylic acid.

Polymers of the above mentioned aromatic carboxylic acids with aldehydes or acetylene are also useful.

In addition, various polyvalent metal salts of the above mentioned phenolic compounds and aromatic carboxylic acids (including their polymers with aldehydes or acetylene) are also useful as acceptor. Among the polyvalent metals which can form such metallic salts like this there are included magnesium, aluminum, calcium, titanium, chromium, manganese iron, cobalt, nickel, copper, zinc silver, cadmium, tin and barium. Preferred metals are zinc, magnesium, aluminum and calcium.

Among useful inorganic acceptors there may be included activated clay, acid clay, attapulgite, bentonite, colloidal silica, aluminum silicate, magnesium silicate, zinc silicate, tin silicate, calcined kaolin and talc.

The above enumerated acceptors may be used either solely or in combination.

The heat fusible material used in the present invention should have a melting point within the range of 60° C. to 200° C., preferably within the range of 65° C. to 120° C. and be capable of dissolving at least one of the colorless chromogenic material and the acceptor therein when melted. Some of the compounds enumerated as acceptors in the above may meet these requirements. Any of such compounds can never been incorporated to any colorless chromogenic material to prepare finely divided particles including colorless chromogenic material because a color developing reaction occurs when they are bonded together. Those compounds can only be useful to prepare acceptor particles in combination with any other acceptive compounds.

In view of the above limitation preferred heat fusible materials are those which do not react on any colorless chromogenic material to produce a color when brought into contact in a liquid phase with the latter. Among those heat fusible materials there may be included the following compounds:

| | m.p.(°C.) |
|---|---|
| 2,6-diisopropyl-naphthalene | 68 |
| 1,4,5-trimethyl-naphthalene | 63 |
| 2,3,5-trimethyl-naphthalene | 146 |
| 2,3,6-trimethyl-naphthalene | 102 |
| 1,5-dimethylnaphthalene | 82 |
| 1,8-dimethylnaphthalene | 65 |
| 2,3-dimethylnaphthalene | 105 |
| 2,6-dimethylnaphthalene | 113 |
| 2,7-dimethylnaphthalene | 98.5 |
| 1,2,3,4-tetramethylnaphthalene | 106 |
| 1,3,6,8-tetramethylnaphthalene | 85 |
| 1,4,5,8-tetramethylnaphthalene | 131 |
| 1,2,6,7-tetramethyl-4-isopropylnaphthalene | 103 |
| 1,3,6,7-tetramethyl-4-isopropylnaphthalene | 97 |
| 2,7-di-tert-butylnaphthalene | 104 |
| 1,2-di-o-tolylethane | 66 |
| α-methyl-4,4'-di-tert-butyl-diphenylmethane | 94 |
| 1,2-di-p-tolylethane | 82 |
| 1,2-bis(4-ethylphenyl)ethane | 69.8 |
| 1,1,2,2-tetramethyl-1,2-di-p-tolylethane | 159 |
| α,β-bis(tert-butylphenyl)ethane | 149 |
| 2,3-di-m-tolylbutane | 97 |
| 2,3-dimethyl-2,3-di-p-tolylbutane | 158 |
| diphenyl-p-tolylmethane | 72 |
| 1,2-dibenzylbenzene | 78 |
| 1,3-dibenzylbenzene | 59 |
| 1,4-dibenzylbenzene | 86 |
| diphenyl-o-tolylmethane | 83 |
| 3,4-diphenylhexane | 92 |

-continued

| | m.p.(°C.) |
|---|---|
| 1,2-bis(2,3-dimethylphenyl)ethane | 112 |
| 1,2-bis(2,4-dimethylphenyl)ethane | 72 |
| 1,2-bis(3,5-dimethylphenyl)ethane | 86 |
| 4'-methyl-4'-α-methyl-p-methylbenzyl,-1,1-diphenylethane | 85 |
| bis(2,4,5-trimethylphenyl)methane | 98 |
| bis(2,4,6-trimethylphenyl)methane | 135 |
| 1,2-bis(2,4,6-trimethylphenyl)ethane | 118 |
| (2,3,5,6-tetramethylphenyl)-(4-tert-butylphenyl) methane | 117 |
| 1,6-bis(2,4,6-trimethylphenyl)hexane | 74 |
| bis(2,6-dimethyl-4-tert-butylphenyl)methane | 135 |
| 1,18-diphenyl-octadecane | 61 |
| 4,4'-dimethylbiphenyl | 121 |
| 2,4,6,2',4',6'-hexamethylbiphenyl | 101 |
| 4,4'-di-tert-butylbiphenyl | 128 |
| 2,6,2'6,'-tetramethylbiphenyl | 67 |
| 1,3-terphenyl | 87 |

In additive to the above, the following acid amides are also useful:

| | m.p.(°C.) |
|---|---|
| stearic acid amide | 99 |
| stearic acid methylenebisamide | 140 |
| oleic acid amide | 68–74 |
| palmitic acid amide | 95–100 |
| physeteric acid amide | 65–72 |
| coconut fatty acid amide | 85–90 |

The above enumerated heat fusible materials may be used either solely or in combination at will.

In order to prepare finely divided particles of colorless chromogenic material or acceptor to which a heat fusible material is incorporated any of the following manners may preferably be utilized:

(1) At least one heat fusible material and at least one colorless chromogenic material or organic acceptor are admixed in a co-melted state. After cooling the obtained mass is pulverized into finely divided particles utilizing attritor, sand mill, ball mill or any other pulverizer.

(2) At least one heat fusible material and at least one colorless chromogenic material or organic acceptor are admixed in a co-melted state. The melt mixture is then dispersed and emulsified in a non-solvent medium in which any of said fusible material and colorless chromogenic material or organic acceptor can not be dissolved. The most typical non-solvent medium would be water but any other proper mediums may be properly selected depending upon the nature of each of the heat fusible material and colorless chromogenic material or organic acceptor used. Suitable emulsifiers such as sodium dodecylsulfate, sodium stearate and dodecyl alcohol may of course be utilized if required.

(3) At least one heat fusible material and at least one colorless chromogenic material or acceptor are dissolved in an organic solvent e.g., methylalcohol, benzene or trichloroethane. Co-precipitation is then carried out with use of a large amount of a medium which cannot dissolve any of the both components. The precipitation is, if necessary, further pulverlized.

Among the above three methods, the first two would be more preferable because of simple and economical processes.

In case where inorganic compounds are solely used as acceptor the above methods cannot be utilized because those inorganic compounds are not fusible at relatively low temperature. However, those inorganic acceptors may be used in combination with any organic acceptor. The heat fusible material may be incorporated to the mixture of an inorganic acceptor with an organic acceptor in a similar manner to the above mentioned (1). In such the case like this the inorganic acceptor may preferably be added to a co-melt of an organic acceptor with a heat fusible material.

It would also be possible to obtain finely divided particles of a heat fusible material incorporated to a colorless chromogenic material or an organic or inorganic acceptor by first preparing finely divided, preferably microporous, particles of such a colorless chromogenic material or organic or inorganic acceptor and then incorporating thereto a heat fusible material through the utilization of absorption or coating technique, if necessary, followed by a further pulverlization step.

The melting point of the heat fusible material is lower than the melting point of the acceptor used.

Finely divided particles of colorless chromogenic material or acceptor may further include inorganic metal compounds and/or inorganic pigments which are useful to improve the color developing ability of the organic acceptor and the light registance.

If those inorganic metal compounds and/or inorganic pigments are incorporated to any colorless chromogenic material they must be substantially non reactive on the colorless chromogenic material. Among useful metal compounds there are included, by way of examples, zinc oxide, magnesium oxide calcium oxide, barium oxide, aluminum oxide, tin oxide, magnesium hydroxide, aluminum hydroxide, calcium hydroxide, zinc hydroxide, tin hydroxide, magnesium carbonate, zinc carbonate, calcium carbonate.

Among useful inorganic pigments there may be enumerated various white pigments such as kaolin, clay, barium, sulfate, zinc sulfide. Those inorganic metal compounds or inorganic pigments may be added, preferably in the form of finely divided particles, to the co-melt in the above inventive method (1). The amount of such inorganic metal compounds and inorganic pigments is preferably within the range of 4 parts or less by weight per one part by weight of the organic acceptor used.

The amount of the heat fusible material depends on the properties of the heat fusible material used and the combinations of colorless chromogenic materials and acceptors. However, generally speaking the amount of the heat fusible material would be within the range of 0.2 to 30 parts by weight, preferably 0.5 to 10 parts by weight, per one part by weight of the colorless chromogenic material or acceptor used.

Generally, in the color developing layer of a heat-sensitive record material the amount of the acceptor is larger than the amount of the colorless chromogenic material. Usually, the amount of the acceptor is within the range of 1 to 50 parts by weight, preferably 4 to 10 parts by weight, per one part by weight of colorless chromogenic material. It is recommendable to incorporate the heat fusible material to the colorless chromogenic material rather than to the acceptor. In this manner, the degree of recrystallization of the heat fusible material can be reduced and a good sensitivity at low temperatures can be maintained.

The color developing layer including finely divided particles of colorless chromogenic material and finely divided particles of acceptor at least one of said two kinds of finely divided particles further including a heat fusible material incorporated thereto, may be formed by coating a suitable base sheet either by a single step coating with a single coating composition in which colorless chromogenic material particles and acceptor particles are dispersed or by a two step coating with two coating compositions in colorless chromogenic material particles and acceptor particles are respectively dispersed. In the coating composition a binder such as starch, modified starch, hydroxyethyl cellulose, methyl cellulose, carboxymethylcellulose, gelatin, casein, gum arabic, polyvinyl alcohol, styrene-maleic anhydride copolymer emulsion, styrene-butadiene copolymer emulsion, vinylacetate-maleic anhydride copolymer emulsion, salts of polyacrylicacid is used in an amount of 10 to 40% by weight, preferably 15 to 30% by weight with respect to the total solid amount. In the coating composition various agents and additives may be used. For example, in order to improve the color developing ability, enhance the light resistance and obtain matting effect the before-mentioned inorganic metal compounds and inorganic pigments may be added in an amount of 0.1 to 5 parts by weight, preferably 0.2 to 2 parts by weight per one part of the acceptor used. Further dispersing agents such as sodium dioctylsulfosuccinate, sodium dodecylbenzenesulfonate, sodium laurylalcoholsulfuric acid ester and metal salts of fatty acid, ultraviolet ray absorbing agents such as benzophenone derivatives and triazol derivatives, defoaming agents, fluorescent dyes, coloring dyes may also be added to the coating composition. The coating composition may also contain dispersion or emulsion including stearic acid, polyethylene, carnauba wax, paraffin wax, zinc stearate, calcium stearate, ester wax in order to prevent the heat-sensitive record material from being stuck in contact with stylus of a recording head. The base sheet may be any of known types. The typical sheet material would be papers, plastic films and synthetic papers. If the base sheet is transparent the recorded sheet may be used as the second copying master. The amount of the coating composition for forming the color developing layer is not particularly limited but usually it would be within the range of 2 to 12 g/m$^2$ preferably 3 to 7 g/m$^2$ on dry basis.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLE 1.

(1) Preparation of a dye liquid:

The following composition was melted at 140° C. to form a homogeneous mixture.

| | |
|---|---|
| 2-phenylamino-3-methyl-6-(N-ethyl-N-p-tolyl)-amino-fluoran | 20 parts |
| stearic acid amide (m.p.99° C.) | 80 parts |

Then, the mixture was cooled and the obtained mass was crushed to obtain granular product (I) having a particle size of about 300 microns.

A ball mill was loaded with the following composition:

| | |
|---|---|
| the above granular product (I) | 100 parts |
| kaolin | 20 parts |
| 10% aqueous solution of polyvinyl alcohol | 300 parts |

Pulverization was continued until an average particle size of 3 microns to obtain dye liquid (I).

(2) Preparation of an acceptor liquid:

A ball mill was loaded with the following composition:

| | |
|---|---|
| 4,4'-isopropylidenediphenol (bisphenol A) | 100 parts |
| kaolin | 20 parts |
| 10% aqueous solution of polyvinyl alcohol | 300 parts |
| montanic ester wax | 20 parts |

Pulverization was continued until an average particle size of 3 microns to obtain acceptor liquid (I).

(3) Making a heat-sensitive record material:

The following liquids were mixed to make a coating composition.

| | |
|---|---|
| dye liquid (I) | 100 parts |
| acceptor liquid (I) | 100 parts |

The coating composition was coated on a base sheet of 50 g/m$^2$ in the weight of an amount of 5 g/m$^2$ on dry basis to obtain a heat-sensitive record material.

Control 1

(1) Preparation of a dye liquid:

A ball mill was loaded with the following composition:

| | |
|---|---|
| 2-phenylamino-3-methyl-6-(N-ethyl-N-p-tolyl)amino-fluoran | 20 parts |
| stearic acid amide (m.p.99° C.) | 80 parts |
| kaolin | 20 parts |
| 10% aqueous solution of polyvinyl alcohol | 300 parts |

Pulvizeration was continued until an average particle size of 3 microns to obtain dye liquid (II).

(2) Preparation of an acceptor liquid:

The same acceptor liquid (I) as in Example 1 was used.

(3) Making a heat-sensitive record material:

The following liquids were mixed to make a coating composition.

| | |
|---|---|
| dye liquid (II) | 100 parts |
| acceptor liquid (I) | 100 parts |

the coating composition was coated in the same manner as in Example 1 to obtain a control heat-sensitive record material.

The $\gamma$-characteristic and the color developing sensibility in terms of the temperature applied and the developed color density of the heat-sensitive record materials obtained by Example 1 and Control 1 were examined. Namely, the record material was pressed with a pressure of 4 kg/cm$^2$ for 5 seconds on a plate heated at selected temperatures to develop color images. The color density of the image was measured with Macbeth densitometor, Model No. RD-100 R (manufactured by Macbeth Corporation, U.S.A.). The test results are shown in the following table.

| color density | temperature 60° C. | 70° C. | 80° C. | 100° C. | 120° C. | 140° C. | 160° C. |
|---|---|---|---|---|---|---|---|
| Example 1 | 0.17 | 0.68 | 1.04 | 1.25 | 1.31 | 1.32 | 1.33 |
| Control 1 | 0.15 | 0.34 | 0.76 | 1.11 | 1.28 | 1.31 | 1.33 |

The γ-characteristic represents the rising tendency of color developing. A larger γ-value indicates that the maximum density is rapidly reached. The color developing sensibility is generally defined with a temperature in which the color density $\overline{D}$ of the obtained color image becomes 0.8. The temperature being low indicates that the color developing sensibility is superior.

As shown in the above table, the heat-sensitive record material obtained in Example 1 has a large γ-characteristic and a good color developing sensibility in comparison with that in Control 1.

EXAMPLE 2

(1) Preparation of a dye liquid:

The following composition was melted at 85° C. to form a homogeneous mixture.

| | |
|---|---|
| 2-phenylamino-3-methyl-6-(N-ethy-N-p-tolyl) aminofluoran | 20 parts |
| 2,6-diisopropylnaphthalene(m.p.68° C.) | 100 parts |

Then the mixture was cooled and the obtained mass was crushed to obtain granular product (II).

A ball mill was loaded with the following composition:

| | |
|---|---|
| the above granular product (II) | 120 parts |
| kaolin | 20 parts |
| 5% aqueous solution of hydroxyethylcellulose | 600 parts |

Pulverization was continued until an average particle size of 3 microns to obtained dye liquid (III).

(2) Preparation of an acceptor liquid:

A ball mill was loaded with the following composition:

| | |
|---|---|
| zinc 3,5-di-α-methylbenzylsalicylate | 100 parts |
| zinc oxide | 20 parts |
| 20% aqueous solution of oxidized starch | 100 parts |
| 10% aqueous solution of polyvinyl alcohol | 100 parts |

Pulverization was continued until an average particle size of 3 microns to obtain a acceptor lqiuid (II).

(3) Making a heat-sensitive record material:

(a) Making an under coating layer

Acceptor liquid (II) was coated on a base sheet of 50 g/m$^2$ in the weight of an amount of 3 g/m$^2$ on dry basis.

(b) Making an upper coating layer

Dye liquid (III) was coated on the under coating layer maked in (a) step in the weight of an amount of 3 g/m$^2$ on dry basis to obtain a heat-sensitive record material.

Control 2

(1) Preparation of a dye liquid:

The following composition was passed through a sand grinder.

| | |
|---|---|
| 2-phenylamino-3-methyl-6-(N-ethyl-N-p-tolyl)-aminofluoran | 20 parts |
| 2,6-diisopropylnaphthalene (m.p. 68° C.) | 100 parts |
| kaolin | 20 parts |
| 5% aqueous solution of hydroxyethylcellulose | 600 parts |

Pulverization was continued until an average particle size of 3 microns to obtain dye lqiuid (IV).

(2) Making a heat-sensitive record material:

Dye liquid (IV) was coated on the under coating layer obtained in Example 2 in the weight of an amount of 3 g/m$^2$ on dry basis to obtain a control heat-sensitive reocrd material.

The properties of the heat-sensitive record material were tested in the same manner as in Example 1. The results are shown in the following table.

The heat-sensitive record material obtained by Example 2 has a large γ-characteristic and a high color density in comparison with Control's one.

| Color density | Temperature 60° C. | 70° C. | 80° C. | 100° C. | 120° C. | 140° C. |
|---|---|---|---|---|---|---|
| Example 2 | 0.45 | 1.21 | 1.22 | 1.25 | 1.26 | 1.27 |
| Control 2 | 0.14 | 0.85 | 0.96 | 1.12 | 1.23 | 1.24 |

EXAMPLE 3

(1) Preparation of a dye liquid:

The same composition as used in the step (1) of Example 2 was melted at 85° C. to form a homogeneous mixture. The mixture was added slowly into 500 parts of 5% aqueous solution of gelatin at 85° C. with stirring to emulsify the mixture in the solution so that the average particle size of about 3 microns was reached. The obtained emulsion was cooled.

The following composition was mixed to obtain dye liquid (V).

| | |
|---|---|
| the above emulsion | 620 parts |
| kaolin | 20 parts |
| 5% aqueous solution of carboxymethylcellulose | 100 parts |

(2) Making a heat-sensitive record material:

Dye liquid (V) was coated on the under coating layer obtained in Example 2 in the weight of an amount of 3 g/m$^2$ on dry basis to obtain a heat-sensitive record material.

The γ-characteristic and color density of the heat sensitive record material were tested in the same manner as in Example 1. They are shown in the following table together with the results obtained in Control 2. The properties of it are superior to those of Control's one.

| color density | temperature 60° C. | 70° C. | 80° C. | 100° C. | 120° C. | 140° C. |
|---|---|---|---|---|---|---|
| Example 3 | 0.45 | 1.20 | 1.21 | 1.24 | 1.25 | 1.25 |
| Control 2 | 0.14 | 0.85 | 0.96 | 1.12 | 1.23 | 1.24 |

EXAMPLE 4

(1) Preparation of a dye liquid:

The following composition was passed through a sand grinder.

| | |
|---|---|
| crystal violet lactone | 10 parts |
| calcium carbonate | 20 parts |
| 5% aqueous solution of methylcellulose | 300 parts |
| 20% aqueous emulsion of polyethylene wax (average molecular weight of 3000) | 5 parts |

Pulverization was continued until an average particle size 3 microns to obtain dye liquid (VI).

(2) Preparation of an acceptor liquid:

The following composition was melted at 140° C. to form a homogeneous mixture.

| | |
|---|---|
| 4,4'-cyclohexylidenediphenol | 50 parts |
| palmitic acid amide (m.p. 95-100° C.) | 50 parts |

Then the mixture was cooled and the obtained mass was crushed to obtain granular product (III).

The following composition was passed through a sand grinder.

| | |
|---|---|
| the above granular product (III) | 100 parts |
| kaolin | 20 parts |
| 5% aqueous solution of methylcellulose | 300 parts |

Pulverization was continued until an average particle size of 3 microns to obtain acceptor liquid (III).

(3) Making a heat-sensitive record material:

The following liquids were mixed to make a coating composition.

| | |
|---|---|
| dye liquid (VI) | 100 parts |
| acceptor liquid (III) | 100 parts |

The coating composition was coated on a base sheet of 50 g/m$^2$ in the weight of an amount of 4 g/m$^2$ on dry basis to obtain a heat-sensitive record material.

Control 3

(1) Preparation of a dye liquid:

Dye liquid (VI) obtained in Example 4 was used.

(2) Preparation of an acceptor liquid:

The following composition was passed through a sand grinder.

| | |
|---|---|
| 4,4'-cyclohexylidenediphenol | 50 parts |
| palmitic acid amide (m.p. 95-100° C.) | 50 parts |
| kaolin | 20 parts |
| 5% aqueous solution of methylcellulose | 300 parts |

Pulverization was continued until an average particle size of 3 microns to obtain acceptor liquid (IV).

(3) Making a heat-sensitive record material:

The following liquids were mixed to make a coating composition.

| | |
|---|---|
| dye liquid (VI) | 100 parts |
| acceptor liquid (IV) | 100 parts |

The coating composition was coated on a base sheet in the same manner in Example 4 to obtain a heat-sensitive record material.

The properties of the heat-sensitive record materials obtained in Example 4 and Control 3 were tested in the same manner as in Example 1. The γ-characteristic and color density are shown in the following table:

| Color | Temperature | | | | | |
|---|---|---|---|---|---|---|
| density | 60° C. | 70° C. | 80° C. | 100° C. | 120° C. | 140° C. |
| Example 4 | 0.05 | 0.06 | 0.12 | 0.62 | 1.06 | 1.16 |
| Control 3 | 0.04 | 0.04 | 0.10 | 0.34 | 0.92 | 1.12 |

EXAMPLE 5

(1) Preparation of a dye liquid:

10 parts of crystal violet lactone and 100 parts of 4'-methyl-4"-α-methyl-p-methylbenzyl-1,1-diphenylethane (m.p. 85° C.) were melted at 90° C. to form a homogeneous mixture. The mixture was added into 700 parts of 2% aqueous solution of sodium stearate heated at 75° C. to form an emulsion. The emulsion was stirred until the average particle size of 3 microns was reached and then cooled. After the emulsion was neutralized with 0.001N HCl, 300 parts of 5% aqueous solution of methyl-cellulose was added into the emulsion to obtain dye liquid (VII).

(2) Preparation of an acceptor liquid:

The following composition was passed through a sand grinder:

| | |
|---|---|
| 3-phenyl-5α,α-dimethylbenzylsalicylic acid | 100 parts |
| zinc oxide | 20 parts |
| 5% aqueous solution of methylcellulose | 500 parts |

Pulverization was continued until an average particle size of 3 microns to obtain acceptor liquid (V).

(3) Making a heat-sensitive record material:

The following liquids were mixed to make a coating composition:

| | |
|---|---|
| dye liquid (VII) | 400 parts |
| acceptor liquid (V) | 500 parts |

The coating composition was coated on a base sheet of 50 g/m$^2$ in the weight of an amount of 5 g/m$^2$ on dry basis to obtain a heat-sensitive reocrd material.

Control 4

(1) Preparation of a dye liquid:

A ball mill was loaded with the following composition:

| | |
|---|---|
| crystal violet lactone | 10 parts |
| 4'-methyl-4"-α-methyl-p-methylbenzyl 1,1-diphenylethane (m.p. 85° C.) | 100 parts |
| water | 700 parts |
| 5% aqueous solution of methylcellulose | 300 parts |

Pulverization was continued until an average particle size of 3 microns to obtain dye liquid (VIII).

A heat-sensitive record material was obtained in the same manner as in Example 5 except that dye liquid (VIII) was used instead of dye liquid (VII).

The properties of the heat-sensitive record materials obtained in Example 5 and Control 4 were tested in the same manner as in Example 1. The resultant γ-characteristic and color density are shown in the following table:

| Color density | Temperature | | | | | |
|---|---|---|---|---|---|---|
| | 60° C. | 70° C. | 80° C. | 100° C. | 120° C. | 140° C. |
| Example 5 | 0.13 | 0.28 | 1.09 | 1.19 | 1.22 | 1.23 |
| Control 4 | 0.09 | 0.15 | 0.87 | 1.15 | 1.21 | 1.23 |

EXAMPLE 6

(1) Preparation of a dye liquid:

Dye liquid (VI) obtained in Example 4 was used.

(2) Preparation of an acceptor liquid:

The following composition was melted at 90° C. to form a homogeneous mixture.

| | |
|---|---|
| 3-phenyl-5-α,α-dimethylbenzylsalicylic acid | 50 parts |
| zinc oxide | 100 parts |
| 2,6-diisopropylnaphthalene (m.p. 68° C.) | 200 parts |

Then the mixture was cooled and the obtained mass was roughly pulverized to obtain granular product (IV).

The following composition was passed through a sand grinder:

| | |
|---|---|
| the above granular product (IV) | 350 parts |
| 5% aqueous solution of methylcellulose | 1400 parts |

Pulverization was continued until an average particle size of 3 microns to obtain acceptor liquid (VI).

(3) Making a heat-sensitive record material:

The following liquids were mixed to make a coating composition:

| | |
|---|---|
| dye liquid (VI) | 100 parts |
| acceptor liquid (VI) | 200 parts |

The coating composition was coated on a base sheet of 50 $g/m^2$ in the weight of an amount of 5 $g/m^2$ on dry basis to obtain a heat-sensitive record material.

Control 5

(1) Preparation of an acceptor liquid:

The following composition was passed through a sand grinder:

| | |
|---|---|
| 3-phenyl-5-α,α-dimethylbenzylsalicylic acid | 50 parts |
| zinc oxide | 100 parts |
| 2,6-diisopropylnaphthalene (m.p. 68° C.) | 200 parts |
| 5% aqueous solution of methylcellulose | 1400 parts |

Pulverization was continued until an average particle size of 3 microns to obtain acceptor liquid (VII).

A heat-sensitive record material was obtained in the same manner as the Example 6 except that acceptor liquid (VII) was used instead of acceptor liquid (VI).

The properties of the heat-sensitive record material obtained in Example 6 and Control 5 were tested in the same manner in Example 1. The resultant γ-characteristic and color density are shown in the following table:

| Color density | Temperature | | | | | |
|---|---|---|---|---|---|---|
| | 60° C. | 70° C. | 80° C. | 100° C. | 120° C. | 140° C. |
| Example 6 | 0.25 | 1.17 | 1.22 | 1.24 | 1.24 | 1.24 |
| Control 5 | 0.18 | 0.52 | 0.90 | 1.19 | 1.23 | 1.24 |

EXAMPLE 7

(1) Preparation of a dye liquid:

The following composition was melted at 140° C. to form a homogeneous mixture:

| | |
|---|---|
| 3-pyrrolidino-6-methyl-7-anilinofluoran | 50 parts |
| stearic acid amide (m.p. 99° C.) | 50 parts |

Then the mixture was cooled and the obtained mass was roughly pulverized to obtain granular product (V).

A ball mill was loaded with the following composition:

| | |
|---|---|
| the above granular product (V) | 100 parts |
| kaolin | 20 parts |
| 20% aqueous solution of styrene-maleic anhydride copolymer | 60 parts |
| water | 420 parts |
| sodium dialkylsulfosuccinate | 1 part |

Pulverization was continued until an average particle size of 3 microns to obtain dye liquid (IX).

(2) Preparation of an acceptor liquid:

The following composition was melted at 140° C. to form a homogeneous mixture:

| | |
|---|---|
| 4,4'-cyclohexylidenediphenol | 50 parts |
| stearic acid amide (m.p. 99° C.) | 50 parts |

Then the mixture was cooled and the obtained mass was crushed to obtain granular product (VI).

A ball mill was loaded with the following composition:

| | |
|---|---|
| the above granular product (VI) | 100 parts |
| kaolin | 20 parts |
| 20% aqueous solution of styrene-maleic anhydride copolymer | 60 parts |
| water | 420 parts |
| sodium alkylsulfosuccinate | 1 part |

Pulverization was continued until an average particle size of 3 microns to obtain acceptor liquid (VIII).

(3) Making a heat-sensitive record material:

The following composition was mixed to make a coating composition:

| | |
|---|---|
| dye liquid (IX) | 100 parts |
| acceptor liquid (VIII) | 400 parts |
| 20% aqueous solution of styrene-maleic anhydride copolymer | 400 parts |
| 20% aqueous emulsion of zinc stearate | 80 parts |

The coating composition was coated on a base sheet of 50 $g/m^2$ in the weight of an amount of 5 $g/m^2$ on dry basis to obtain a heat sensitive record material.

Control 6

(1) Preparation of a dye liquid:

A ball mill was loaded with the following composition:

| | |
|---|---|
| 3-pyrrolidino-6-methyl-7-anilinofluoran | 50 parts |
| stearic acid amide | 50 parts |
| kaolin | 20 parts |
| 20% aqueous solution of styrene- | |

-continued

| | |
|---|---|
| maleic anhydride copolymer | 60 parts |
| water | 420 parts |
| sodium alkylsulfosuccinate | 1 part |

Pulverization was continued until average particle size of 3 microns to obtain dye liquid (X).

(2) Preparation of an acceptor liquid:

A ball mill was loaded with the following composition:

| | |
|---|---|
| 4,4'-cyclohexylidenediphenol | 50 parts |
| stearic acid amide | 50 parts |
| kaolin | 20 parts |
| 20% aqueous solution of styrene-maleic anhydride copolymer | 60 parts |
| water | 420 parts |
| sodium alkylsulfosuccinate | 1 part |

Pulverization was continued until an average particle size of 3 microns to obtain acceptor liquid (IX).

A heat sensitive record material was prepared in the same manner as in Example 7 except that dye liquid (X) and acceptor liquid (IX) were used instead of dye liquid (IX) and acceptor liquid (VIII).

The properties of the heat-sensitive record materials obtained in Example 7 and Control 6 were tested in the same manner in Example 1.

The resultant $\gamma$-characteristic and color density are shown in the following table:

| Color | Temperature | | | | | |
|---|---|---|---|---|---|---|
| density | 60° C. | 70° C. | 80° C. | 100° C. | 120° C. | 140° C. |
| Example 7 | 0.08 | 0.13 | 0.85 | 1.18 | 1.20 | 1.21 |
| Control 6 | 0.07 | 0.10 | 0.62 | 1.04 | 1.18 | 1.20 |

What we claim is:

1. In a heat-sensitive record material comprising a base sheet having a color developing layer which includes finely divided particles comprising colorless chromogenic material and finely divided particles comprising acceptor which is reactive with said colorless chromogenic material to develop a color the improvement in at least one of said two kinds of finely divided particles further including a heat fusible material co-melted with said colorless chromogenic material or said acceptor to form a co-melt material, said heat fusible material having a melting point within the range of 60° C. to 200° C. and being capable of dissolving at least one of said colorless chromogenic material and said acceptor therein when melted.

2. A heat-sensitive record material as defined in claim 1, in which said heat fusible material has a melting point within the range of 65° C. to 120° C.

3. A heat-sensitive record material as defined in claim 1, in which said heat fusible material is co-melted with said colorless chromogenic material and is substantially non-reactive with said colorless chromogenic material.

4. A heat-sensitive record material as defined in claim 1, in which said finely divided particles of colorless chromogenic material or acceptor further include at least one inorganic metal compound or inorganic pigment.

5. A heat-sensitive recording material as defined in claim 1 in which the amount of the said heat fusible material is within the range of 0.2 to 30 parts by weight per one part by weight of said colorless chromogenic material or acceptor.

6. A heat-sensitive record material as defined in claim 1, in which said heat fusible material is co-melted with said acceptor.

7. A heat-sensitive record material as defined in claim 6, in which said acceptor is an organic acceptor.

8. A heat-sensitive record material as defined in claim 6, in which said acceptor comprises a mixture of an organic acceptor with an inorganic acceptor.

9. In a heat-sensitive record material comprising a base sheet having a color developing layer which includes finely divided particles comprising colorless chromogenic material and finely divided particles comprising acceptor which is reactive with said colorless chromogenic material to develop a color the improvement in at least one of said two kinds of finely divided particles further including a heat fusible material co-melted with said colorless chromogenic material or said acceptor to form a co-melted material, said heat fusible material having a melting point within the range of 60° C. to 200° C. and being substantially non-reactive with said colorless chromogenic material when said co-melted material includes said colorless chromogenic material, said heat fusible material being capable of dissolving at least one of said colorless chromogenic material and said acceptor therein when said co-melted material is melted with said at least one of said colorless chromogenic material and said acceptor.

* * * * *